United States Patent [19]

Pemberton et al.

[11] Patent Number: 4,575,130
[45] Date of Patent: Mar. 11, 1986

[54] COUPLING APPARATUS

[75] Inventors: Eugene B. Pemberton, Fairfield; Richard L. Fahl, Cincinnati, both of Ohio

[73] Assignee: Dover Corporation, Cincinnati, Ohio

[21] Appl. No.: 368,626

[22] Filed: Apr. 15, 1982

[51] Int. Cl.⁴ .............................................. F16L 37/20
[52] U.S. Cl. ....................................... 285/38; 285/93; 285/312; 285/423; 141/349
[58] Field of Search ............... 285/311, 310, 312, 309, 285/420, DIG. 21, 38, 93, 423; 141/346–349, 351, 383, 387, 388, 291–295

[56] References Cited

U.S. PATENT DOCUMENTS

| | | | |
|---|---|---|---|
| 2,634,927 | 4/1953 | Smith et al. | 285/DIG. 21 |
| 3,425,717 | 2/1969 | Bruce | 285/312 X |
| 3,494,641 | 2/1970 | Caregnato | 285/311 |
| 3,860,274 | 1/1975 | Ledstrom et al. | 285/312 |

FOREIGN PATENT DOCUMENTS 741191 11/1955 United Kingdom ................ 285/312

Primary Examiner—Dave W. Arola
Attorney, Agent, or Firm—Kinney and Schenk

[57] ABSTRACT

A coupling apparatus specifically designed for an elbow of a fluid distribution system has a pair of rollers which are rotatable about first rotary axes which are movable with respect to the elbow and second rotary axes which move the first rotary axes in an arcuate path. The rollers selectively engage a locking groove of a second pipe section. The locking groove has arcuate portions with a radius equal to that of the rollers.

The rollers are generally moved in unison but are permitted a small range of independent movement to insure locking of both rollers in the locking groove in the event of slight misalignments due to manufacturing tolerances.

26 Claims, 8 Drawing Figures

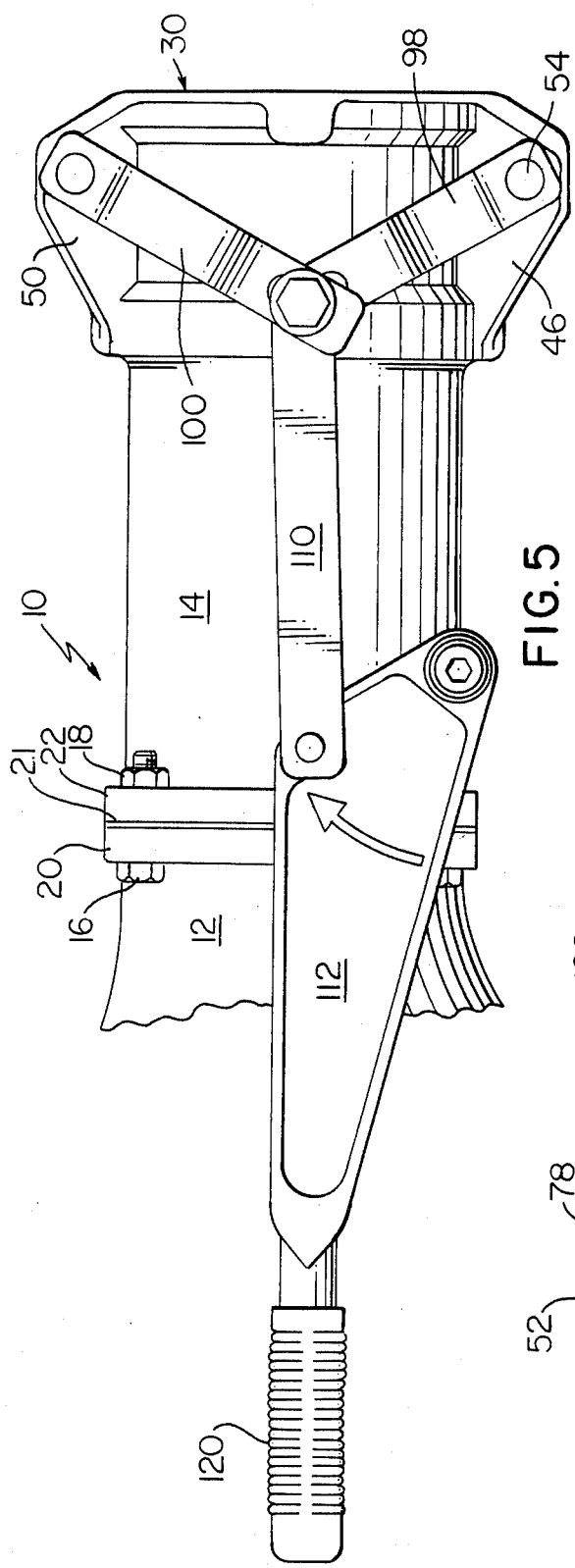
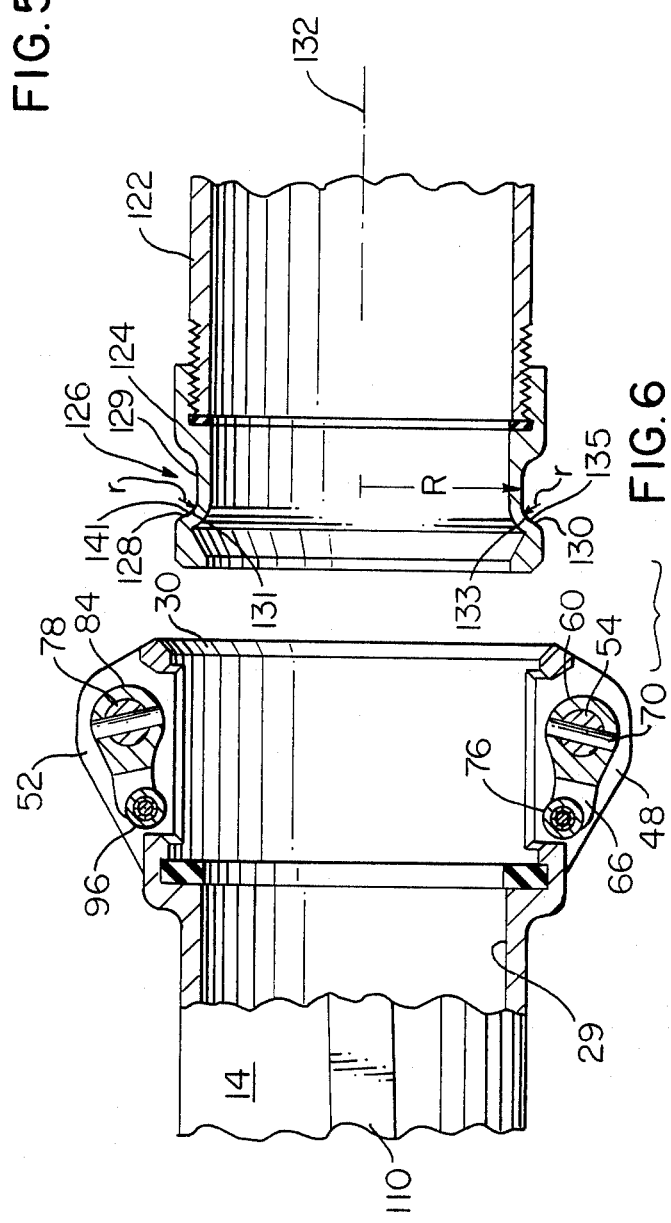

COUPLING APPARATUS

BACKGROUND

The present invention relates generally to locking systems for securing adjoining sections of pipe and more particularly concerns a roller type locking mechanism that minimizes wear with a mating adaptor. The invention will be disclosed in connection with an elbow used to connect a transport tank truck delivery hose to the fill pipe of an underground storage tank.

Gasoline service stations generally store gasoline in underground storage tanks located on the service station premises. The gasoline stored in these tanks is withdrawn by an above ground pump whenever it is desired to dispense the gasoline. The pump, which is usually mounted in a pedestal adjacent to the service station dispensing location, withdraws the gasoline from the underground storage tank and directs it into a flexible hose. A manually operated dispensing nozzle is generally attached to the hose. This dispensing nozzle has a spout which is designed for insertion into a gasoline fill tank of a vehicle or the like during the dispensing process.

The gasoline in these underground storage tanks is commonly furnished by a tank truck which is driven to the service station location. It is common for the underground storage tank to have a fill pipe which extends to a location that is very near ground level. The fill pipe may be disposed in a manhole in the ground and located near the pumps. When the tank truck is brought to the service station, a cover for the manhole is removed and a delivery hose is connected between the tank truck and the fill pipe. This connection between the delivery hose of the tank truck and the fill pipe is usually through an elbow pipe section. The elbow pipe section receives the delivery hose at an above ground level and extends underground where it is connected to the fill pipe.

It is highly desirable to provide a tight, unbroken flow path from the tank truck to the storage tanks. A tight unbroken flow path expedites the flow rate in the storage tanks, minimizing the fill time, and helps eliminate possible hazards caused by overflows or escaping vapors accumulating at ground level.

In order to minimize the time required to set up the delivery hose connection with the fill pipe, it has become common to provide the top of the fill pipe with an adaptor which is matingly received by an end of the elbow pipe section with a quick set up and release locking system.

The present invention provides for an improved locking system which can be used to readily and securely connect an elbow pipe section to a fill pipe. This improved locking system will provide a tight and secure fit between these two elements while minimizing wear between the elements. Minimizing wear on the adaptor of the fill pipe is particularly important.

It is an object of the present invention to provide an improved locking system for mating parts on adjacent sections of pipe.

It is a further object of the present invention to provide a locking system for adjoining sections of pipe that minimizes wear.

It is another object of the present invention to provide an elbow piping section for connecting a gasoline tank truck with an underground storage tank with an improved locking system for securing the elbow section to the fill pipe.

It is a further object of the present invention to provide a locking system for an elbow piping section which is significantly less costly to manufacture.

SUMMARY OF THE INVENTION

In accordance with the invention, a coupling apparatus is provided for selectively coupling adjacent pipe sections. The apparatus includes first and second pipe sections with the second pipe section having a locking groove associated therewith. One of either the first or second pipe sections is at least partially insertable into an opening of the other pipe section. A roller which is rotatably movable about a first rotational axis is movably mounted on the first pipe section to permit movement of the first rotational axis with respect to that first pipe section. Actuating means are also provided which are associated with the first pipe section for moving the first rotational axis from a first unlocked position to a second locked position. The roller is disposed outside the locking groove in the first position and disposable within the locking groove when the actuating means is in the second position, and one of the first or second pipe sections is at least partially inserted into the opening of the other pipe section.

In accordance with another aspect of the invention, at least one additional roller having a rotational axis movable with respect to the first pipe section is mounted thereon for selective engagement with the locking groove associated with the second pipe section.

In accordance with a further aspect of the invention, the locking groove is circumferentially disposed about the exterior periphery of the second pipe section, and the second pipe section is at least partially insertable into an opening of the first pipe section.

In accordance with a further aspect of the invention, the roller is rotatably mounted in a yoke which is movable about a second rotary axis.

According to a further aspect of the invention, the second rotary axis of the yoke is fixed relative to the first pipe section.

According to a further aspect of the invention, the roller extends between two end supports of the yoke.

In accordance to another aspect of the invention, the rollers are interconnected for joint movement.

According to yet another aspect of the invention, each of the rollers is rotatably mounted between a pair of end supports in a separate yoke.

In accordance to a further aspect of the invention, the yokes are interconnected for joint movement.

In yet another aspect of the invention, the roller and the additional roller are disposed approximately 180° away from each other about the circumferential surface of the first pipe section.

In accordance with still another aspect of the invention, each of the yokes is rigidly affixed to a pair of drive stems with the yokes being rotatable about the axes of the drive stems.

In accordance with a further aspect of the invention, a pair of lever arms are provided. One of the pair of lever arms is rigidly attached to each yoke with the lever arms extending generally perpendicular to the drive stems in a direction generally toward each other.

In yet another aspect of the invention, an actuating link is connected to both of the lever arms.

According to a further aspect of the invention, the connection between the pair of lever arms and the actuating link is through a common fastening member.

In accordance with a further aspect of the invention, an acutating lever is provided which is pivotally connected to the first pipe section. The actuating lever is connected to the actuating link.

In yet another aspect of the invention, a handle is provided on the actuating lever and the connection between the actuating link and the actuating lever is intermediate to the handle and the pivotal connection of the actuating lever to the first pipe section.

In accordance to a further aspect of the invention, the common fastening member is a pin-like member extending through apertures in both lever arms and the actuating link.

In accordance with yet another aspect of the invention, the pin-like member is a stud which is threadably received in a sleeve with the lever arms and actuating link being rotatable about the sleeve.

In yet another aspect of the invention, the pin-like member has an exterior dimension which is less than the corresponding dimensions of the apertures to enable one of the links to move independently of the other link.

In accordance with yet another aspect of the invention, the clearance between the exterior dimension of the pin-like fastening member and the corresponding dimension of the apertures is between 0.029 inches and 0.051 inches.

In yet another aspect of the invention, the clearance between the exterior dimension of the pin-like fastening member and the corresponding dimension of the apertures is between 0.029 and 0.039 inches.

In accordance to a further aspect of the invention, the roller is mounted on a pivot pin.

In accordance with yet another aspect of the invention, a bearing is interposed between the roller and the pivot pin.

In yet another aspect of the invention, the bearing between the roller and pivot pin is formed of a reinforced fiberglass backed material.

In yet another aspect of the invention, the bearing between the roller and pivot pin is lined with a fluorocarbon material.

In yet another aspect of the invention, the roller is formed of steel.

In accordance to a further aspect of the invention, the locking groove has two sidewalls and a bottom wall with the interface between one of the sidewalls and the bottom wall having a arcuate configuration.

In accordance with yet a further aspect of the invention, the arcuate configuration between one of the sidewalls and the bottom wall has a radius which is approximately equal to the radius of the roller.

In accordance to a further aspect of the invention, the roller rolls down the sidewall into the arcuate interface between the sidewall and bottom wall as the yoke is rotated about its rotary axis and the configuration of the sidewall provides a minimum spacing between the yoke's rotary axis proximal to the arcuate interface between one of the sidewalls and the bottom walls.

In accordance with a further aspect of the invention, a coupling apparatus for selectively coupling adjacent pipe sections is provided with a roller having a radius equal to the radius of a portion of a locking groove. The apparatus includes first and second pipe sections with the second pipe section having a locking groove associated therewith. At least one of the first or second pipe sections is at least partially insertable to the other to facilitate coupling of the pipe sections. The locking groove has a portion with an arcuate configuration with the radius of the arcuate configuration being equal to the radius of the roller. Means are also provided for rotatably moving the first rotational axis of the roller about a second rotary axis which is fixed relative to the first pipe section.

In accordance with a further aspect of the invention, the roller rolls into the sidewall into the arcuate portion as the rotatably moving means moves about a second rotary axis when one of the first or second pipe sections is at least partially inserted into the other. A location of minimum spacing between the sidewall and the second rotational axis is also provided proximal to the arcuate portion. The roller passes through this location of minimum spacing as it rolls into the sidewall into the arcuate portion.

In accordance with yet another aspect of the invention, an apparatus for selectively coupling adjacent pipe sections includes a pair of lever arms interconnected to a pair of rollers. This apparatus includes first and second pipe sections with the second pipe section having a locking groove associated therewith. One of the first or second pipe sections is at least partially insertable to the other to facilitate coupling of the pipe sections. A pair of rollers are mounted on the first pipe section and selectively rollable into the locking groove. The roller is disposed about the circumferential surface of the first pipe section with the rollers having axes which are substantially perpendicular to the center line of the pipe sections. A pair of lever arms are interconnected to the rollers for effectuating movement thereof. One of the pair of lever arms is interconnected to each of the rollers. The lever arms extend in the direction substantially perpendicular to the rotary axis of the rollers and generally toward each other toward the centerline of the pipe sections. Each of the lever arms have apertures in their end portions proximal to the pipe centerline. An actuating link with an aperture therein extends in a direction generally parallel with the pipe centerline. A pin-like member extends through the apertures of the actuating link and the lever arms and provides a common connection between the actuating link and lever arms. The exterior dimension of the pin-like member in the direction of the actuating link is less than the dimension of the apertures in the corresponding direction to allow oblique orientation of the pin-like member between the lever arms and permit independent movement of one of the lever arms relative to the other.

BRIEF DESCRIPTION OF THE DRAWINGS

Other objects and advantages of the invention will become apparent upon reading the following detailed description and upon reference to the drawings, in which:

FIG. 5 is a fragmentary side elevational view of the elbow of FIG. 1 showing the actuating handle and actuating linkage in an unlocked position.

FIG. 6 is a fragmentary side elevational view, partially in cross section, of the end section of the elbow of FIG. 1 and an adjoining fill pipe with an adaptor depicting the position of the locking rollers when the actuating handle and actuating linkage are in the position illustrated in FIG. 5.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appending claims.

DETAILED DESCRIPTION OF THE PREFERRED EMBODIMENT

Figure 1:
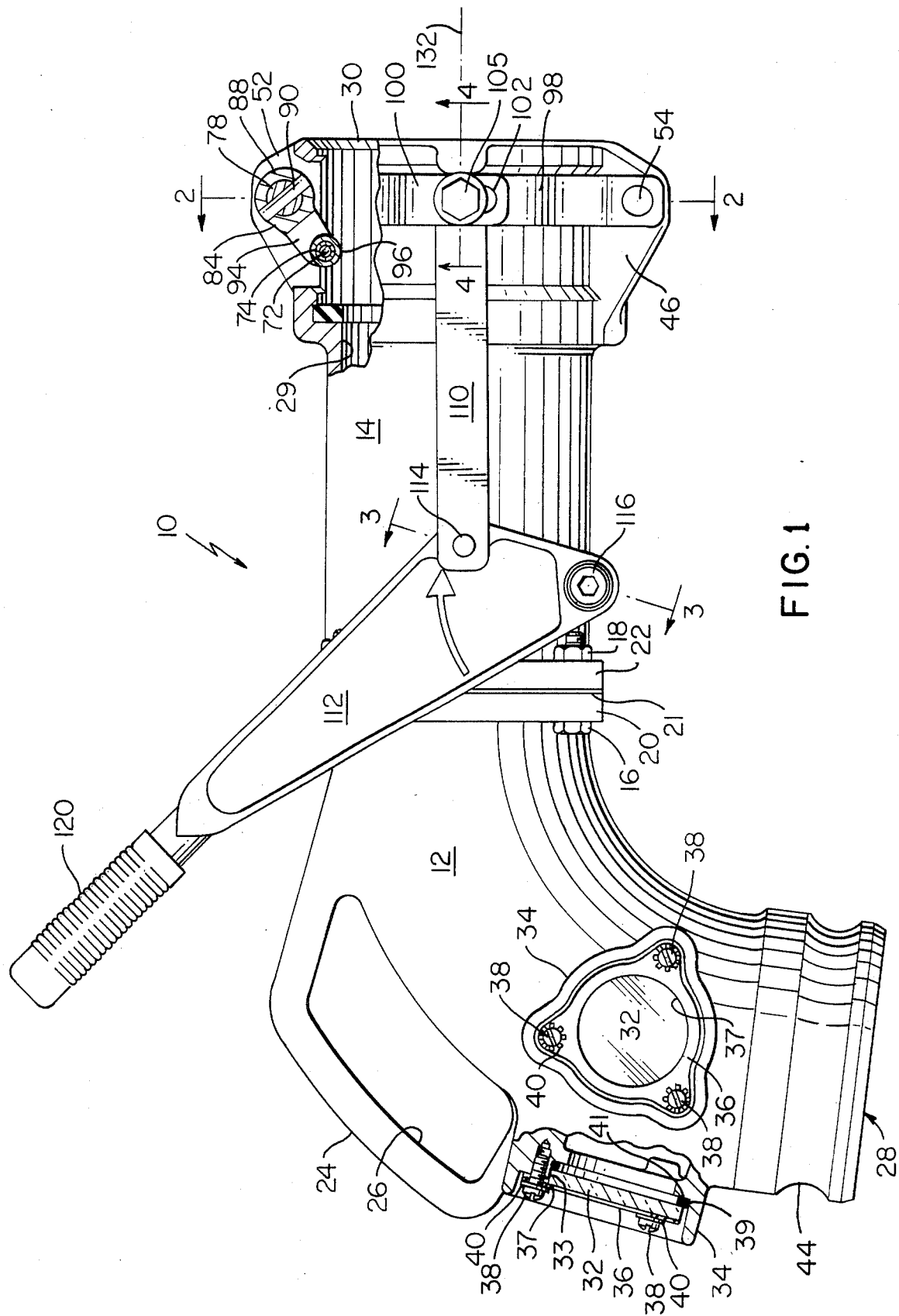
FIG. 1 is a side elevational view, partially in a cross section, of an elbow used to connect a transport tank truck delivery hose to the fill pipe of an underground storage tank depicting the improved locking system of the present invention.

Referring now to the drawings and to FIG. 1 in particular, a first pipe section in the form of an elbow generally designated by the numeral 10 is depicted. The elbow has a two part body including an upper body portion 12 and a lower body portion 14, both of which are formed of aluminum in the preferred embodiment. The upper and lower body portions 12 and 14 respectively, are joined to each other by a plurality of bolts 16 and nuts 18 (only one bolt 16 and nut 18 are shown in FIG. 1) which extend through mutually aligned apertures (not shown) in the flanges 20 and 22. The flange 20 is formed on upper body portion 12 and the flange 22 is formed on the lower body portion 14. A gasket 21 is interposed between the flanges 20 and 22 to provide a seal between the upper and lower body portions 12 and 14. The gasket 21 also has aligned apertures (not shown) to accommodate the bolts 16.

As perhaps suggested above, the upper body portion 12 has an inlet 28 on its free end opposite the flange 20 while the lower body portion 14 has an outlet 30 on its free end, opposite the flange 22. The inlet 28 and outlet 30 are in fluid communication with each other through an internal passageway 29 which extends completely through the elbow 10 and the flanges 20 and 22.

As clearly seen from FIG. 1, the upper body portion 12 has a handle 24 integrally formed thereon. The handle 24 defines an aperture 26 between itself and the upper body portion 12, which aperture 26 allows a person carrying the elbow 10 to encircle his fingers about the handle 24 to grip the elbow 10.

It is also seen that the upper body portion 12 has three (only two of which are shown on FIG. 1) sight glasses 32 proximal to the inlet 28 of the elbow section 10. These sight glasses (actually formed of plastic) allow visual perception of an internal fluid passage extending through the elbow and enable a user to determine whether fluid flow is occurring in that internal flow passage. The sight glasses are formed of plastic and are mounted in aperture 33 of sight glass formed apertures 34. A steel retaining plate 36 with a centrally disposed aperture 37 is exteriorly mounted about the periphery of the sight glass 32 to hold the sight glass 32 in place. The retaining plate 36 is, in turn, secured to the glass seal through the agency of a plurality of retaining screws 38, retained in place by lock washers 40. A sealing gasket 39 formed of a suitable resilient material, such as BUNA-N, for example, circumscribes the apertures 33 and is interposed between the sight glass 32 and a shoulder 41 of the sight glass formed apertures 34.

The upper body portion 12 has a circumferential groove 44 on its exterior periphery proximal to the inlet 28. As shown, the groove 44 has an arcuate cross sectional configuration and is adapted to receive a coupling element from an adjacent pipe section for connection to a tank truck delivery hose.

The lower body portion 14 has a series of bosses 46, 48, 50 and 52 (see FIG. 2 also) proximal to the outlet 30. These bosses 46, 48, 50 and 52 are arranged in two cooperating pairs. The first pair of bosses 46 and 48 has aligned apertures 46a and 48a respectively and cooperate to jointly receive a drive stem 54. The drive stem 54 is pivotally journaled on its end portion by the bosses 46 and 48. A flanged bearing 56, of brass or other suitable material, is fitted in aperture 46a and circumferentially disposed about the end portion of the drive stem 54, which drive stem 54 is pivotally journaled in boss 46. Similarly, a flanged bearing 58 is submitted in aperture 48a and circumferentially disposed about the end portion of the drive stem 54 which is pivotally journaled in boss 48.

A yoke 60 is secured to the central portion of the drive stem 54. The yoke 60 has a main body portion 62 with two axially spaced radially outward extending arms 64 and 66. The main body portion 62 of the yoke 60 has a bore 68 through which the drive stem 54 extends. A pin 70 extends radially through both the yoke 60 and the drive stem 54 to prevent relative rotary movement between the two elements 60 and 54. Thus, rotation of the drive stem 54 effectuates rotation of the yoke 60.

The arms 64 and 66 of the yoke 60 also have aligned apertures which jointly and cooperatively support the end portions of a pivot pin (not shown). Although the pivot pin supported by the arms 64 and 66 is not illustrated in FIG. 1, it is identical to pivot pin 72 depicted in that illustration. The central portion of these pivot pins (72 as well as the pivot pin supported in yoke 60) circumferentially support a bearing 74 which, in turn, supports a roller 76. In the preferred embodiment, this roller 76 is formed of steel. The bearing 74 is preferably formed of a fluorocarbon lined filament wound, reinforced fiberglass backed material. The roller 76 is thus rotatably mounted between yoke arms 64 and 66 about a rotational axis which is noncoincident and parallel to the pivotal axis of drive stem 54. Since pin 70 prevents relative rotary movement between the drive stem 54 and the yoke 60, rotational movement of the drive stem 54 will cause arcuate movement of the roller 76.

The second pair of bosses 50 and 52 are disposed approximately 180° about the circumferential periphery of the lower body portion 14 with respect to the bosses 46 and 48. Bosses 50 and 52 have aligned apertures 50a and 52a respectively. These aligned apertures 50a and 52a support the outer portions of another drive stem 78. Flanged bearings 80 and 82 are fitted in the apertures 50a and 52a respectively and provide a rotary bearing surface for the outer portion of the drive stem 78.

In a manner like drive stem 54, drive stem 78 supports a yoke 84 on its central portion. The yoke 84 has a bore 86 in its main body portion 88 which accommodates the drive stem 78. A pin 90 extends radially through the yoke 84 and drive stem 78 to transmit rotary force applied to the drive stem 78 to the yoke 84 and to prevent relative rotational movement between these two elements. Two axially spaced radially extending arms 92 and 94 depend from the main body portion 88 of the yoke 84. The arms 92 and 94 have aligned apertures which support a roller 96. The roller 96 is circumferentially disposed about a bearing 74, which bearing is in turn circumferentially disposed about the pivot pin 72 (FIG. 1). The pivot pin 72 is fixed in the aligned apertures of arms 92 and 94. Like the roller 76 and the drive stem 54, the roller 96 is moved in an arcuate path whenever the drive stem 78 is rotated. Thus, the rollers 76 and 96 are rotatable about first rotational axes about the pivot pins 72 which are movable relative to the first pipe section 10 as well as a second rotary axis about drive stems 54 and 78 which are fixed relative to this first pipe section 10.

Figure 2:
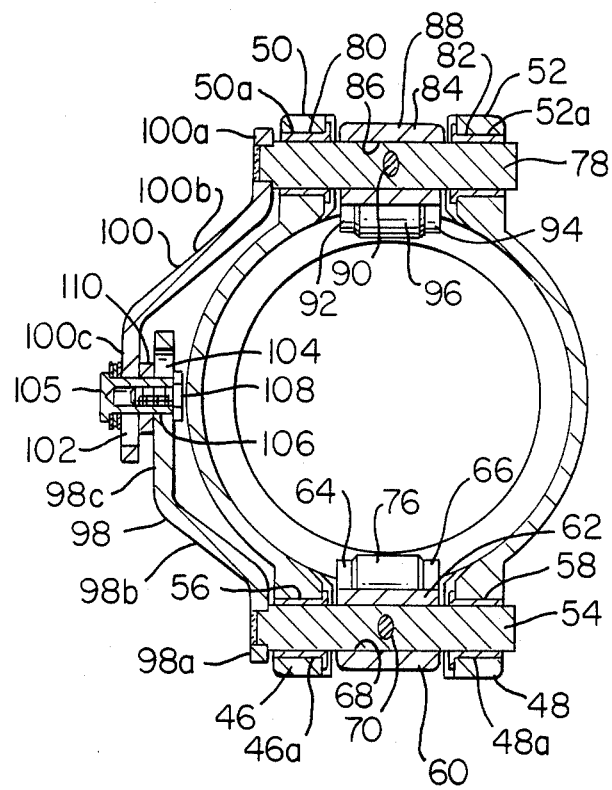
FIG. 2 is a rotated cross sectional view of the elbow of FIG. 1 taken along line 2—2 in FIG. 1.

The drive stems 54 and 78 are rigidly secured to lever arms 98 and 100 respectively. These lever arms 98 and 100 extend generally toward each other and toward a pipe centerline 132. As best seen in FIG. 2, each of the lever arms 98 and 100 has a first portion which extends radially outward from the drive stem, portion 98a of the lever arm 98 extending radially outward from the drive stem 54 and portion 100a of lever arm 100 extending radially outward from drive stem 78. Adjacent to the radially outward extending portions 98a and 100a respectively, are obliquely extending portions 98b and 100b. The free ends 98c and 100c respectively of each of the lever arms 98 and 100, distal to the drive stems 54 and 78, angularly adjoin the obliquely extending portions 98b and 100b. The free ends 98c and 100c are generally parallel to the radially extending portions 98a and 100a respectively and generally parallel to each other. One of the two obliquely extending portions 98b or 100b is longer than the other so as to space the free ends 98c and 100c from each other. In the illustrated embodiment, obliquely extending portion 100b is longer than portion 98b so that free end 100c is exteriorly disposed with respect to free end 98c.

Figure 3:
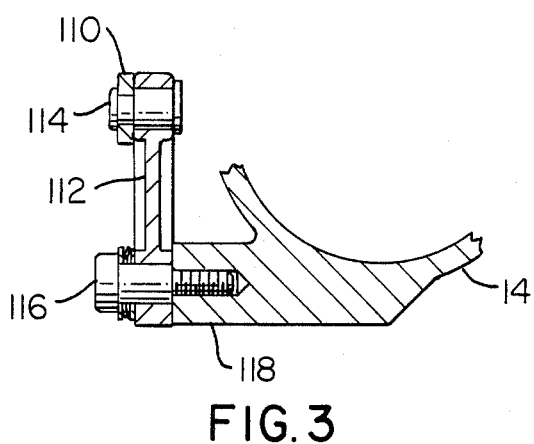
FIG. 3 is a rotated fragmentary cross sectional view taken along line 3—3 in FIG. 1 depicting the interrelationship of the elbow body, actuating handle and actuating linkage.

Each of the free ends 98c and 100c have elongated slots or apertures, elongated slot or aperture 102 extending through lever arm 100 and elongated slot or aperture 104 extending through lever arm 98. A pin-like fastening member 105 in the form of a sleeve 106 and stud 108 extends through each of these apertures or slots 102 and 104, interconnecting the arms 98 and 100. The fastening member 105 also interconnects the two lever arms 98 and 100 to an actuating link 110. The actuating link 110 (as seen in FIG. 1) is interconnected to lever arms 98 and 100 by the fastening member which also extends through an aperture 110a at one end of the actuating link 110. The opposite end of the actuating link 110 is pivotally connected to an actuator handle 112. A fastening pin 114 pivotally connects the actuating link 110 with the actuator handle 112. As shown in FIGS. 1 and 3, the actuator handle 112 is also pivotally connected to the lower body portion 14 by a shoulder screw 116 which extends through the actuator handle 112 proximal to one end thereof and into a boss 118 which extends outwardly of the lower body portion 14 (see FIG. 3). The actuator handle 112 is pivotally attached to the actuating link 110 intermediate the handle grip 120 and shoulder screw 116. This intermediate connection of the actuating link 110 increases the mechanical advantage of the actuator handle 112 and ultimately transmits a greater force to rollers 76 and 96. The opposite end of the actuator handle 112, distal to the shoulder screw 116 is a handle grip 120 formed of vinyl which is designed to accommodate the hand grip of a user. As should be apparent from the above description, the actuator handle 112 is designed to be manually grasped by the handle grip 120 and rotated about shoulder screw 116. This arcuate motion of the actuator handle 112 effectuates substantially rectilinear movement of the actuating link 110, which, in turn, imparts its motion to the pin-like fastening member 105. Due to the interconnections with the fastening member 105 and actuating link 110, the above described movement forces movement of the free ends 98c and 100c of the lever arms 98 and 100 respectively to impart rotational motion to the drive stems 54 and 78. The rollers 76 and 96 are then moved through their arcuate paths.

In FIG. 5, the actuator handle 112, actuating link 110, and lever arms 98 and 100 are shown in an opened or unlocked position. When in this unlocked position, the rollers 76 and 96 assume the positions depicted in FIG. 6. In this FIG. 6 position, the rollers 76 and 96 will readily permit insertion and removal of a second and mating pipe section 122. This mating pipe section 122 has an adapter 124 threadably secured by matching threads on the exterior of pipe 122 and interior of the adapter 124 respectively. Although it is clear that the adapter 124 is removable from the pipe 122, they act together in the operation described herein and for purposes of this disclosure will be considered as a single unit.

The adapter 124 has a locking groove 126 proximal to its end. This groove 126 has sidewalls 128 and 130 which adjoin a bottomwall 129. The transition between the sidewalls 128, 130 and bottomwall 129 is provided through arcuate surfaces 131 and 133, arcuate surface 131 serving to adjoin sidewall 128 and bottomwall 129 while arcuate sidewall 133 serves to adjoin sidewall 130 to the bottomwall 129. In the illustrated embodiment, the groove 126 is symetrical with sidewalls 128 and 130 and arcuate surfaces 131 and 133 being substantially mirror images of each other. The arcuate surfaces 131 and 133 each have a radius r, which for the purposes of the present description will be defined as a secondary radius. The groove 126 also has a primary radius R defined by the distance between the bottomwall 129 and the centerline 132 of pipe section 122.

Figure 7:
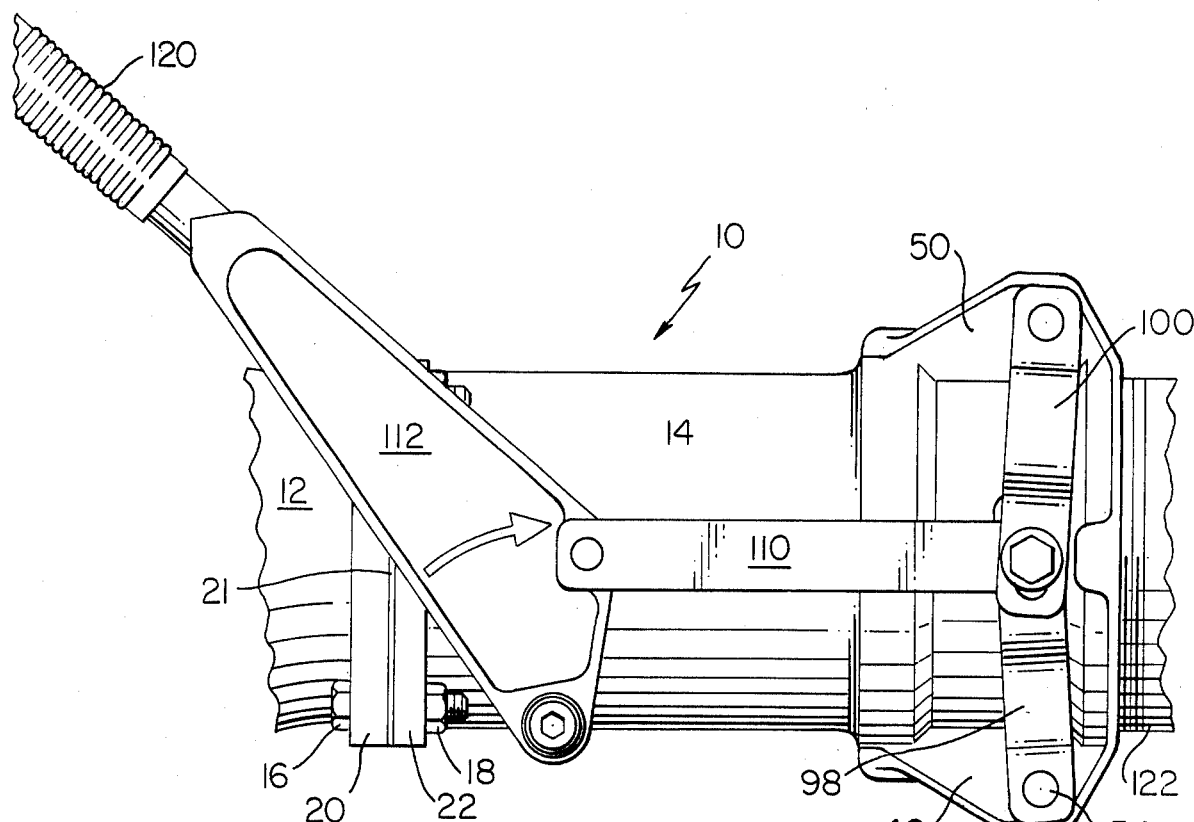
FIG. 7 is a fragmentary side elevational view of the elbow in FIG. 1 showing the actuating handle and actuating linkage in a locking position.
Figure 8:
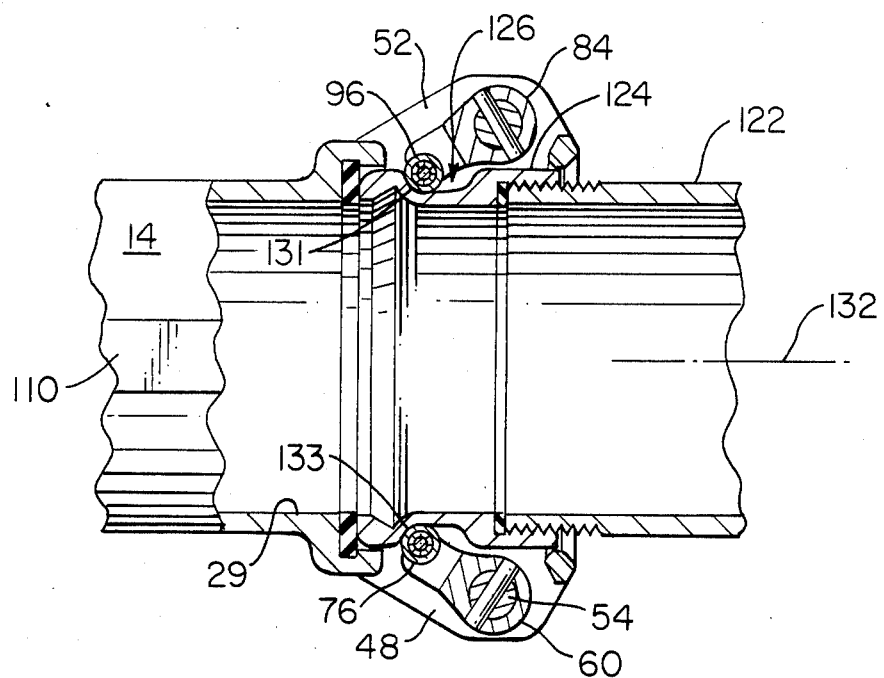
FIG. 8 is a rotated fragmentary side elevational view, partially in cross section, of the end section of the elbow of FIG. 1 corresponding to the position of the acutating handle and actuating linkage of FIG. 7 depicting the locking rollers in a locking engagement with the groove of an adaptor fitted to the end of an adjoining fill pipe.

In FIG. 7, the actuator handle 112, actuating link 110, and lever arms 98 and 100 are shown in closed or locked position. FIG. 8 shows the position of the rollers 76 and 96 which correspond to the FIG. 7 locked position. FIG. 8 further differs from FIG. 6 in that adjoining pipe section 122 is shown inserted into the lower body portion 14. As shown in FIG. 8, when the adjoining pipe section 122 is inserted into the lower body portion and the actuator handle 112, actuating link 110 and lever arms 98 and 100 are in the FIG. 7 locked position, the rollers 76 and 96 are disposed within the locking groove 126 such that they lock the adjoining pipe section 122 into the lower body portion 14.

The adapter 124 and adjoining pipe 122 of the preferred embodiment are located underground. Since these components are underground, replacement becomes costly and time consuming. The present invention, in recognition of these difficulties, is designed to reduce the wear on the adapter as much as possible. It has been found that this goal may be significantly advanced by making the outside radius of rollers 76 and 96 approximately equal to the secondary radius r of the arcuate surfaces 131 and 133. By making the arcuate surfaces 131 and 133 and rollers 76, 96 with the same radius, the contacting surface area between these two elements is maximized for rolling contact. It is also noted that the rollers 76 and 96 of the illustrated embodiment roll about the groove 126 as opposed to direct rubbing, sliding action of any prior art devices. Thus, when forces are applied to the rollers 76 and 96 by way of actuator handle 112, the rollers 76 and 96 have less of a tendency to deform or distort the groove 126 than in the prior art devices.

Due to space limitations of the preferred embodiment, it is necessary to make pivot pin 72 of relatively small diameter. This small diameter of the pin 72 results in relatively high stresses on the bearing 74 as the loads transmitted through the rollers are relatively high. Thus, the bearing material utilized must be carefully selected to meet extreme load requirements. Although the velocity which the roller undergoes is relatively small, it is subjected to a relatively high static pressure. Applicant has found that a fluorocarbon lined filament wound reinforced fiberglass backed bearing material is suitable for this purpose.

In order to insure that both yokes 60 and 84 move their respective rollers 76 and 96 into full engagement with the arcuate surfaces 131 and 133 of the adapter groove 126, extra clearance is provided between the elongated slots or apertures 102 and 104 of the lever arms 100 and 98 respectively. This has been found desirable, since due to manufacturing tolerances, the angular displacement between the yokes 60 and 84 and their cooperating drive stems 54 and 78 may not be precisely the same. If this angular relationship between yoke 60 and drive stem 54 did not match the angular relationship between yoke 84 and drive stem 78, it would be possible to fully couple one of the rollers 76 or 96 in the groove 126 before the other was fully coupled. If the connection between the sleeve 106 and lever arms 98 and 100 was rigid, the coupling in one of these rollers 76 or 96 would prevent further movement of the actuator handle 112 without jamming. Consequently, the other roller 76 or 96 would be prevented from fully coupling.

Figure 4:
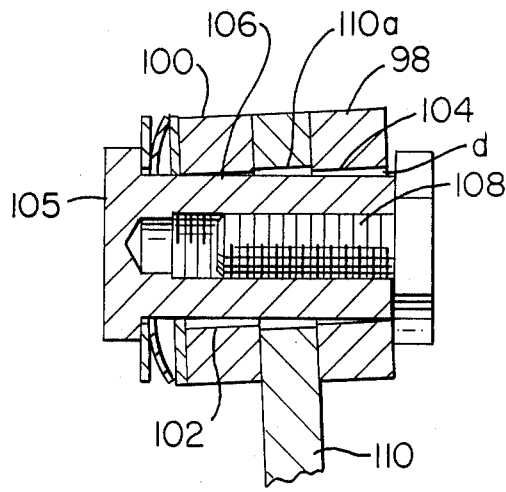
FIG. 4 is an enlarged rotated fragmentary cross sectional view of a sleeve and stud used to interconnect the actuating linkage of FIG. 1 taken along line 4—4 of FIG. 1 and depicting the clearance between the sleeve and the grooves in the linkage which permits misalignment of the sleeve and stud with mating parts.

With specific reference to FIG. 4, it is seen that an extra clearance (d) is provided between the sleeve 106 and lever arms 98, 100 and the actuating link 110. This extra clearance permits the sleeve 106 to "cock" or obliquely orient itself with respect to the slots 102, 104 as depicted in FIG. 4. This "cocking" of the sleeve 106 relative to the slots 102, 104 permits a further movement of the least advanced roller 76, 96 after the first advanced roller 76, 96 fully engages the adapter groove 126. In the preferred embodiment, applicants have found that the preferred maximum radial clearance between the sleeve 106 and slots 102, 104 is between 0.029 and 0.039 inches. It will be appreciated by those skilled in the art that the oblique orientation of sleeve 106 will not result in every instance. Rather, it will occur only in those instances in which the manufacturing tolerances have resulted in a disparity in the angular relationships of yoke 60 and drive stem 54 and the angular relationship of yoke 84 and drive stem 78. When the rollers 76 and 96 are moved form the FIG. 6 position to the FIG. 8 position, the rollers 76 and 96 initially engage sidewalls 130 and 128 respectively and roll down toward the bottomwall 129. Immediately before the rollers reach the arcuate surfaces 133 and 131, they pass center locations 135 and 141 respectively where the interface pressure between the rollers 76, 96 and groove 126 reaches a maximum. The rollers are then passed over this "center" location 135 and 141 by about 5° in the preferred embodiment, into the arcuate surfaces 133 and 131. This "center" is a location of minimum spacing between the sidewalls 130 and 128 and the rotational axis of the yokes 60 and 84. Once the rollers pass over the center locations 135 and 141 into the arcuate surfaces 130 and 131, the interface pressure between the rollers 76, 96 and groove 126 is reduced. Thus, there is little tendency for the rollers to move from the lock position of FIG. 8 toward the unlocked position of FIG. 6. The arcuate surfaces 133 and 131 as mentioned above, have a radius r which matches the radius of the rollers 76 and 96 to maximize surface contact between the groove and the rollers.

While the invention will be described in connection with a preferred embodiment, it will be understood that it is not intended to limit that invention to that embodiment. On the contrary, it is intended to cover all alternatives, modifications and equivalents as may be included within the spirit and scope of the invention as defined by the appended claims.

What is claimed is:

1. In a coupling apparatus for selectively coupling a first component having an opening therein and a second component having a locking groove therein upon disposing said second component with its locking groove within said opening, said apparatus comprising a pair of rotatable rollers, means operatively connecting each of said rollers on said first component while enabling rotation of each roller about an associated first rotational axis, said means operatively connecting including a pair of devices each supporting an associated roller on said first component for pivoting movements about an associated second rotational axis, and means for actuating said devices in a simultaneous manner to move said rollers into and out of said groove to locked and unlocked positions respectively of said first and second components, the improvement wherein said means for actuating said devices comprises an interconnected mechanical linkage system and an actuating lever operatively connected to said linkage system, said lever being the sole means provided for actuating said devices in said simultaneous manner.

2. A coupling apparatus as recited in claim 1 wherein said first and second components comprise first and second pipe sections respectively and said locking groove is circumferentially disposed about the exterior periphery of said second pipe section.

3. A coupling apparatus as recited in claim 2 wherein each of said devices is in the form of a yoke.

4. A coupling apparatus as recited in claim 3 wherein each of said yokes further comprises a main body portion and two arms, said arms being axially spaced and extending outward from said main body portion, and each of said rollers being operatively connected between the arms of its associated yoke.

5. A coupling apparatus as recited in claim 1 wherein said devices and hence said rollers are disposed approximately 180° away from each other about the circumferential surface of said first pipe section.

6. A coupling apparatus as recited in claim 1 wherein each of said rollers is rotatably mounted on an associated pivot pin.

7. A coupling apparatus as recited in claim 6 and further comprising a pair of bearings, each of said bearings being interposed between its roller and its associated pivot pin.

8. A coupling apparatus as recited in claim 7 wherein the bearing between its roller and its pivot pin is formed of a reinforced fiberglass backed material.

9. A coupling apparatus as recited in claim 8 wherein the bearing between its roller and its pivot pin is lined with a fluorocarbon material.

10. A coupling apparatus as recited in claim 9 wherein each of said rollers is made of steel.

11. A coupling apparatus as recited in claim 10 wherein said locking groove has an annular sidewall and an annular bottom wall, and said annular sidewall adjoins said annular bottom wall on an arcuate surface which has a given radius.

12. A coupling apparatus as recited in claim 11 wherein each of said rollers has a radius which is approximately equal to said given radius.

13. A coupling apparatus as recited in claim 12 wherein each roller rolls down said sidewall onto said arcuate surface as its associated yoke is rotated about its associated second rotational axis.

14. In a coupling apparatus for selectively coupling a first component having an opening therein and a second component having a locking groove therein upon disposing said second component with its locking groove within said opening; said apparatus comprising a pair of rotatable rollers; means operatively connecting each of said rollers on said first component while enabling rotation of each roller about an associated first rotational axis; said means operatively connecting comprising, a pair of devices, each of said devices having an inner and an outer end, means supporting each roller on the outer end of an associated device, and means supporting each device on said first component for pivoting movements about an associated second rotational axis; and means for actuating said devices in a simultaneous manner to move said rollers into and out of said groove to locked and unlocked positions respectively of said first and second components; the improvement wherein said means for actuating said devices comprises an interconnected mechanical linkage system and an actuating lever operatively connected to said linkage system; said lever being the sole means provided for actuating said devices in said simultaneous manner; each of said devices being in the form of a yoke; and said means supporting each yoke comprising, a drive stem, each of said drive stems being rotatably supported on said first component and attached to its yoke, each drive stem having a longitudinal axis which defines said an associated second rotational axis, and said drive stems being rotatable by said linkage system and serving as the sole means by which said yokes are pivoted to move said rollers to the locked and unlocked positions thereof.

15. A coupling apparatus as recited in claim 14 wherein said linkage system comprises, a pair of lever arms, each of said pair of lever arms being connected to an associated drive stem, said lever arms extending substantially perpendicular to said drive stems in a direction generally toward each other.

16. A coupling apparatus as recited in claim 15 wherein said linkage system further comprises an actuating link, said link being operatively connected to both of said lever arms.

17. A coupling apparatus as recited in claim 16 wherein said linkage system further comprises a common fastening member connected between said pair of lever arms and said actuating link.

18. A coupling apparatus as recited in claim 17 wherein said actuating lever is operatively connected to said actuating link, and further comprising pivot means pivotally supporting said actuating lever on said first pipe section.

19. A coupling apparatus as recited in claim 18 and further comprising a handle grip for said actuating lever and wherein said actuating link is operatively connected to said actuating lever at a position intermediate said handle grip and said pivot means.

20. An apparatus as recited in claim 18 wherein said common fastening member is a pin-like member which extends through apertures in both of said lever arms and said actuating link.

21. An apparatus as recited in claim 20 wherein said pin-like member is a stud which is threadably received in a sleeve, said lever arms and said actuating link being rotatable about said sleeve.

22. An apparatus as recited in claim 20 wherein said pin-like member has an exterior dimension less than the corresponding dimensions of said apertures, said exterior dimension enables one of said links to move independently of the other of said links.

23. An apparatus as recited in claim 22 wherein the clearance between the exterior dimension of said pin-like fastening member and the corresponding dimension of the apertures is between 0.029 inches and 0.051 inches.

24. In a coupling apparatus for selectively coupling a first component having an opening therein and a second component having a locking groove therein upon disposing said second component with its locking groove within said opening, said locking groove having an annular bottom wall adjoined at one end by an annular sidewall with an arcuate transition surface therebetween, said apparatus comprising a pair of rotatable rollers, means operatively connecting each of said rollers on said first component while enabling rotation of each roller about an associated first rotational axis, said means operatively connecting including a pair of devices each supporting an associated roller on said first component for pivoting movements about an associated second rotational axis, and means for actuating said devices to move said rollers into and out of said groove to locked and unlocked positions respectively of said first and second components, the improvement wherein said means for actuating said devices comprises an interconnected mechanical linkage system and an actuating lever operatively connected to said linkage system, said lever being the sole means provided for actuating said devices in said simultaneous manner, said arcuate transition surface having a given radius, and each of said rollers having a radius which is approximately equal to said given radius.

25. A coupling apparatus as set forth in claim 24 wherein said first and second components comprise first and second pipe sections respectively and said locking groove is circumferentially disposed about and comprises the exterior periphery of said second pipe section.

26. A coupling apparatus as recited in claim 25 wherein said actuating lever has a handle grip and upon actuating said actuating lever using said handle grip each roller rolls down said sidewall onto said arcuate surface as its associated device is rotated about its associated second rotational axis.

* * * * *